United States Patent
Morita

(10) Patent No.: US 6,770,844 B2
(45) Date of Patent: Aug. 3, 2004

(54) METHOD OF CORRECTING LASER BEAM INTENSITY, LASER BEAM INTENSITY CORRECTION MECHANISM AND MULTI-BRANCHED LASER OSCILLATION DEVICE HAVING THE SAME

(75) Inventor: Hiroyuki Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 64 days.

(21) Appl. No.: 10/038,617

(22) Filed: Jan. 8, 2002

(65) Prior Publication Data
US 2002/0088782 A1 Jul. 11, 2002

(30) Foreign Application Priority Data
Jan. 11, 2001 (JP) .................................. 2001-004162

(51) Int. Cl.[7] .......................................... B23K 26/067
(52) U.S. Cl. ........................... 219/121.77; 219/121.73; 359/487
(58) Field of Search ..................... 219/121.73, 121.75, 219/121.77; 359/487

(56) References Cited

U.S. PATENT DOCUMENTS

| | | | |
|---|---|---|---|
| 3,655,268 A | | 4/1972 | Reynolds |
| 4,530,098 A | | 7/1985 | Karaki |
| 4,632,512 A | | 12/1986 | Haerig et al. |
| 4,664,484 A | * | 5/1987 | Hines |
| 5,383,199 A | * | 1/1995 | Laudenslager et al. |
| 5,798,867 A | * | 8/1998 | Uchida et al. |
| 5,948,291 A | | 9/1999 | Neylan et al. ......... 219/121.77 |
| 6,149,278 A | * | 11/2000 | Mao et al. |

FOREIGN PATENT DOCUMENTS

| | | |
|---|---|---|
| EP | 0 859 261 | 8/1998 |
| GB | 1 405 531 | 9/1975 |
| JP | 49-16000 | 4/1974 |
| JP | 59-129485 | 7/1984 |
| JP | 60003993 | 1/1985 |
| JP | 61-121379 | 6/1986 |
| JP | 61121379 | 6/1986 |
| JP | 02249285 | 10/1990 |
| JP | 5-48186 | 2/1993 |
| JP | 9-171152 | 6/1997 |
| JP | 2000-261076 A * | 9/2000 |

* cited by examiner

Primary Examiner—Geoffrey S. Evans
(74) Attorney, Agent, or Firm—Young & Thompson

(57) ABSTRACT

A laser beam oscillation device includes a laser oscillator, a reflection mirror, beam splitters and a reflection mirror leading the laser beam to optical paths, laser beam intensity correction mechanisms correcting the laser beam intensity in each optical path, and optical systems. Each of the laser beam intensity correction mechanisms includes a rotating portion rotating around an optical axis of the laser beam by moving a lever in the case, around an optical substrate slantly fixed to a rotating portion. The optical substrate is rotated around the optical axis while maintaining the Brewster's angle. Subsequently, polarizng operation adjusts transmission intensity of the laser beam such that the laser beam intensity in each optical path becomes equal to each other.

14 Claims, 8 Drawing Sheets

10; LASER BEAM INTENSITY CORRECTION MECHANISM

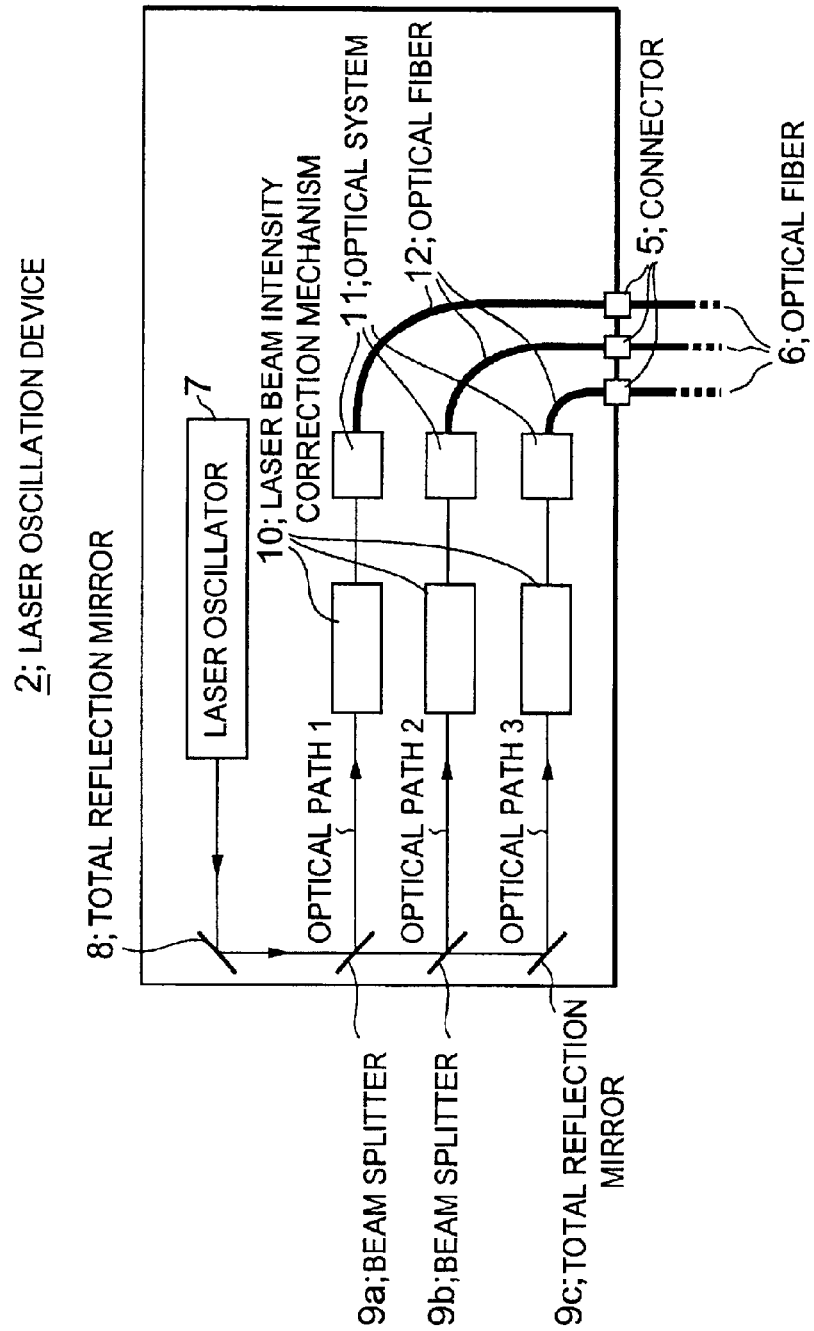

10; LASER BEAM INTENSITY CORRECTION MECHANISM
10a: CASE
10b: OPTICAL SUBSTRATE
10d: ROTATING PORTION
10c: LEVER 10d
10b
10c
10a
INCIDENT OPTICAL AXIS 10a
10b
10d
10c
INCIDENT OPTICAL AXIS

10b: OPTICAL SUBSTRATE
10d: ROTATING PORTION
INCIDENT OPTICAL AXIS
$\theta_B$

METHOD OF CORRECTING LASER BEAM INTENSITY, LASER BEAM INTENSITY CORRECTION MECHANISM AND MULTI-BRANCHED LASER OSCILLATION DEVICE HAVING THE SAME

BACKGROUND OF THE INVENTION

This invention relates to a method of correcting laser beam intensity, a laser beam intensity correction mechanism and a laser oscillation device having the laser beam intensity correction mechanism and, more particularly, to a method of correcting laser beam intensity, a laser beam intensity correction mechanism and a laser oscillation device which are suitable for being used in a laser beam welding machine irradiating a plurality of laser beams at a time.

A laser beam welding machine is generally used for joining metals together. In this laser beam welding, a laser beam emitted from a laser generator or oscillator is converged on a joint portion of a welding member on a stage by an optical system such as an optical fiber and a lens, and then a fused junction is applied thereto. For example, when plate-shaped welding members 14b shown in FIG. 11 are jointed together by laser welding, a laser beam 16 is irradiated onto one end of a joint surface by an emitting unit 13, and continuous welding is performed by moving the stage or by moving an irradiation point of the laser beam 16.

On the other hand, with a progress of technical fields such as an optical communication and an optical information processing, engineering development for connecting each of optical fibers with optical fiber connectors has been progressed. When members such as the optical fiber connectors which require an accuracy in positioning are welded by the laser welding, pulse welding which irradiates pulsed laser beams to several points of the joint surfaces at a time and conducts an instant fused junction is used as shown in FIG. 12.

In this method, since the laser beams are irradiated to several points of the joint surface, the laser beam emitted from the laser oscillator is splitted into a plurality of optical paths by beam splitters. A constitution of the laser oscillation device of the laser welding machine using such multi-branched laser beam is explained by reference to the accompanying drawings. FIG. 10 is a top plan view schematically illustrating a constitution of a conventional laser oscillation device.

As shown in FIG. 10, the conventional laser oscillation device includes; a laser oscillator 7 oscillating a laser beam; a total reflection mirror 8; beam splitters 9a and 9b leading the laser beams to optical paths 1 and 2, respectively; a total reflection mirror 9c leading the laser beam to an optical path 3; filters 17 adjusting the laser beam intensity in each optical path, optical systems 11 leading each of the laser beams to each of optical fibers, respectively; optical fibers 12; and connectors 5. FIG. 10 shows the constitution in which the laser beam is diverged into three optical paths.

Here, the laser beams, each having an equal power, need to be diverged into each of the optical paths 1 to 3, and thus the beam splitter 9a has a constitution in which one-third of the laser beam is reflected and other two-thirds thereof are transmitted. The beam splitter 9b has a constitution in which one-second of the laser beam having transmitted the beam splitter 9a is reflected and other one-second thereof is transmitted. In the optical path 3, there is provided a constitution in which the laser beam having transmitted the beam splitters 9a and 9b is totally reflected. Accordingly, the laser beam divided into three equal parts is made incident onto each optical path, however, in fact, reflectance and transmittance of the beam splitters 9a and 9b include a margin of error on fabrication and there arises dispersion of intensity of the laser beam being made incident onto each optical path.

The filters 17 are conventionally set between the beam splitter 9a, the beam splitter 9b or the total reflection mirror 9c and each of the optical systems 11, respectively. The filter with low transmittance is set to the optical path with high laser beam intensity so that the laser beam of each optical path is equal to others in intensity. The filter with high transmittance is, in reverse, provided to the optical path with low laser beam intensity so as to adjust the laser beam intensity.

As described above, the laser beam intensity is adjusted by inserting each of the filters 17 to each of the optical paths 1 to 3 corresponding to a division ratio of the laser beam in the conventional laser oscillation device. However, the transmittance of the each of the filters 17 to be inserted cannot suitably be adjusted. Thus, the filters 17 having transmittance which is closest to a desired transmittance are selected from a group of filters with a predetermined transmittance (for example, transmission filter of 99% and transmission filter of 95%). Since such filters are inserted to the optical paths so as to adjust the laser beam intensity, a fine adjustment cannot be conducted, although a rough adjustment is applicable. Also, laser beam intensity in each optical path cannot equally be divided with strictness and smoothness.

If the laser beam intensity in each optical path is slightly different, for example and when optical fiber connectors 14a are, as shown in FIG. 12, welded by a laser beam welding, each of welding spots with high laser beam intensity is highly fused as compared to other parts thereof, so that there arises dispersion of contraction when welding members is solidified with each other. As a result, a dislocation arises in each of the optical fiber connectors 14a, which make the optical fiber connectors useless as optical fiber connectors.

In the above method of correcting laser beam intensity, the laser beam intensity in each optical path is adjusted to be equal to others by using the filter with the conventional transmittance, so that the loss of the laser beam in each optical path is increased according to a combination of the filters 17. There causes a problem that a desired laser output cannot be obtained.

Further, when the margin of error is caused in a division ratio by a dislocation, characteristic changes with the elapse of the time or the like in the laser oscillator 7, the beam splitters 9a and 9b, the total reflection mirror 9c or the like, the error needs be corrected. However, in the above method of adjusting by detaching the filters, the filters 17 are taken out by disassembling the laser oscillator once, and are selected again and mounted after measuring the laser beam intensity in each optical path. There arises a problem that the above method requires much time for maintenance.

SUMMARY OF THE INVENTION

An object of the present invention is to provide a method of adjusting laser beam intensity readily and smoothly and to provide a laser beam intensity correction mechanism.

Another object of the present invention is to provide a multi-branched laser oscillation device having the correction mechanism.

In order to solve the above problems, according to the present invention, the method of correcting laser beam intensity comprises the steps of rotating an optical substrate around an optical axis of a laser beam as a rotation axis while maintaining an incident angle of the laser beam thereto, the optical substrate being located in a manner that the incident angle of the laser beam is set at a Brewster's angle and of varying transmission intensity of the laser beam.

In addition, the method of correcting laser beam intensity for a laser oscillation device including a plurality of laser beam paths, a rotation cylinder freely rotating around an optical axis of the laser beam as a rotation axis and an optical substrate fixed at a predetermined slope angle with respect to the optical axis of the laser beam in the rotation cylinder, comprises the steps of: rotating the optical substrate around the optical axis as the rotation axis while maintaining the slope angle by rotating the rotation cylinder; and adjusting the laser beam intensity in each optical path to be equal to others.

A laser beam intensity correction mechanism of the present invention comprises an optical substrate rotating around an optical axis of a laser beam as a rotation axis while maintaining an incident angle, wherein the optical substrate is located in a manner that the incident angle of the laser beam is set at a Brewster's angle, thereby varying transmission intensity of the laser beam by rotating the optical substrate.

Moreover, the laser beam intensity correction mechanism of the present invention comprises a rotation cylinder freely rotating around an optical axis of a laser beam as a rotation axis and an optical substrate fixed at a predetermined slope angle with respect to the optical axis of the laser beam in the rotation cylinder, wherein the optical substrate is rotated around the optical axis as the rotation axis while maintaining the slope angle by rotating the rotation cylinder and transmission intensity of the laser beam is varied. In the present invention, the slope angle of the optical substrate is set in a manner that the incident angle of the laser beam is set at the Brewster's angle. In addition, it is preferable that the optical substrate is made of a quartz plate and a fine adjustment is realized by providing an antireflection coating on at least one surface of the optical substrate.

Further, according to the present invention, the laser oscillation device comprises a laser beam source, a first optical system for splitting the laser beam emitted from the laser beam source into a plurality of optical paths and a correcting arrangement for correcting laser beam intensity provided in at least one optical path, wherein the correcting arrangement includes a rotation cylinder being freely rotated around an optical axis of the laser beam as a rotation axis and an optical substrate slantly fixed in a manner that the incident angle of the laser beam is set at the Brewster's angle, thereby adjusting transmission intensity of the laser beam in a manner that the laser beam intensity in each optical path is equal to others.

BRIEF DESCRIPTION OF THE DRAWINGS

FIG. 3 is a plan view schematically illustrating a constitution of a laser oscillation device in an embodiment of the present invention.

FIG. 4(a) is a front view; FIG. 4(b) is a side view; and FIG. 4(c) is a top plan view.

FIG. 8(a) is a constitutional view of the laser oscillation device and FIG. 8(b) is a view illustrating the beam intensity in each point.

DESCRIPTION OF THE PREFERRED EMBODIMENTS

Figure 4A:
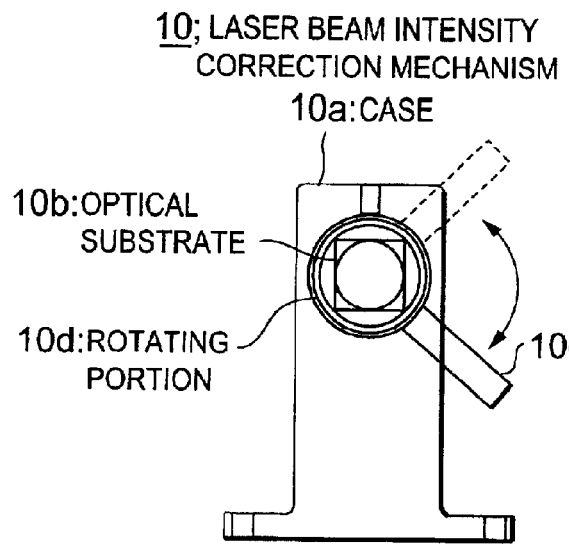
FIGS. 4(a) to 4(c) are views showing a constitution of a laser beam intensity correction mechanism of the present invention.
Figure 4B:
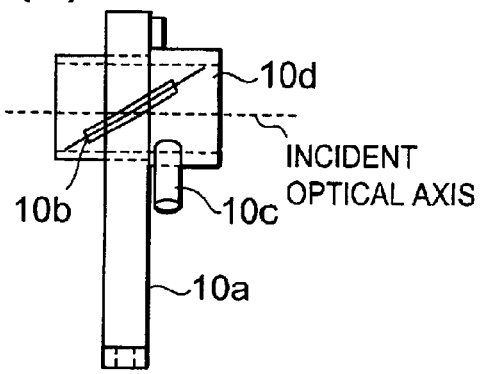
Figure 4C:
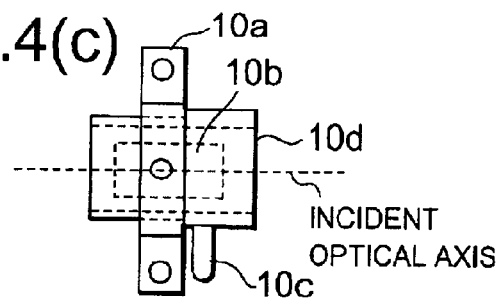

Referring to FIG. 3, a multi-branched laser beam generating (or oscillation) device showing a preferred embodiment of the present invention comprises a laser oscillator 7, a total reflection mirror 8 leading the laser beam emitted from the laser oscillator 7 to diverged optical paths, beam splitters 9a and 9b and a total reflection mirror 9c leading the laser beam to each of the optical paths 1 to 3, laser beam intensity correction mechanisms 10 correcting the laser beam intensity of each optical path, optical systems 11 leading the laser beams to optical fibers 12, respectively, and connectors 5 connected with external optical fibers. Referring to FIGS. 4(a), 4(b) and 4(c), each of the laser beam intensity correction mechanisms 10 includes a case 10a, a rotating portion 10d freely rotataing around an optical axis of the laser beam as a rotation axis in the case, an optical substrate 10b slantly fixed in a manner that an incident angle of the laser beam is set at a Brewster's angle in the rotating portion 10d. The optical substrate 10b is rotated around the optical axis as a rotation axis while maintaining the Brewster's angle by means of rotation of the rotating portion 10d. In addition, polarizing characteristics of the laser beam and the optical substrate 10b can adjust transmission intensity of the laser beam so that the laser beam intensity in each optical path is made equal to others. The rotating portion 10d is moved by a lever 10c.

Figure 1:
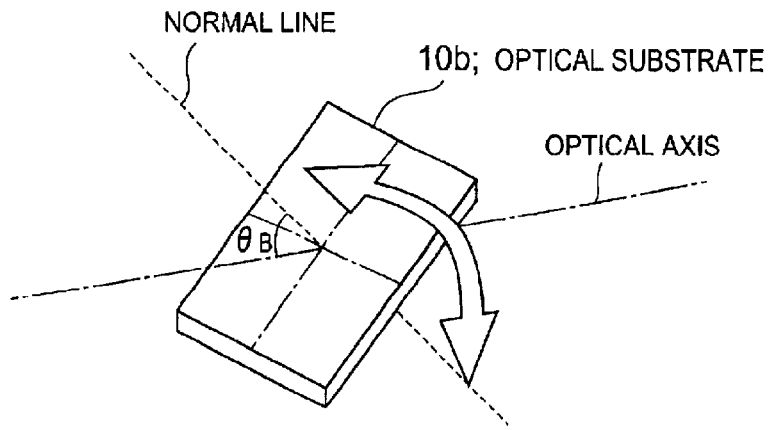
FIG. 1 is a conceptual view explaining a principle of correcting laser beam intensity according the present invention.
Figure 2:
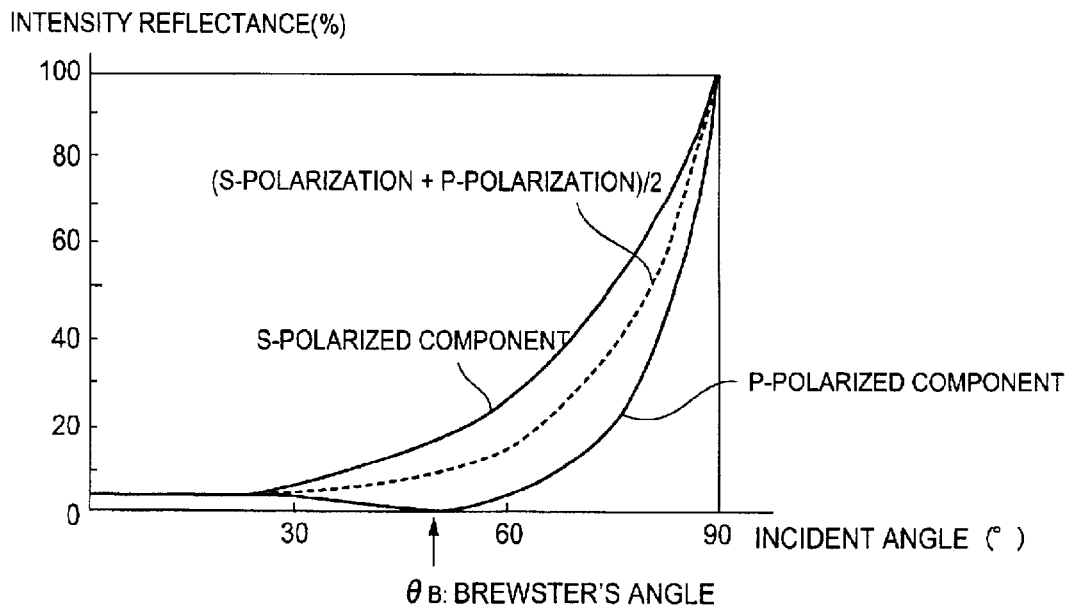
FIG. 2 is a view showing a relationship between an incident angle and intensity reflectance of a beam which is made incident onto a luminous medium.

To explain the above embodiment of the present invention more in detail, the principle of the present invention is illustrated with reference to the FIGS. 1 and 2. FIG. 1 is a schematic view explaining the mechanism of correcting laser beam intensity. FIG. 2 is a view illustrating intensity reflectance of an S-polarized component and a P-polarized component with respect to an incident angle.

First, a relationship between the polarization direction and the reflection and transmission characteristics is explained. As shown in FIG. 2, when a beam is made incident onto a luminous medium slantly set at a predetermined angle with respect to an incident optical axis, in a polarized component (S-polarized component) which is vertical to an incident plane among the incident lights, the intensity reflectance thereof becomes the smallest in a case where an incident angle is 0° (vertical incidence). The polarized component has characteristics that the larger the incident angle thereof is set, the higher the intensity reflectance flatly becomes. On the other hand, a polarized component (P-polarized component), which is horizontal to the incident plane, has well-known characteristics that the intensity reflectance thereof becomes higher gradually with the increase of the incident angle, after the intensity reflectance becomes 0° once. An angle of which the intensity reflectance of the P-polarized component becomes 0° is called the Brewster's angle ($\theta_B$). If the incident angle is $\theta_1$; the refraction angle is $\theta_2$; the refraction ratio of the luminous medium is $n_2$; and the refraction ratio of the air is $n_1$, the reflection ($R_p$) of the P-polarized component, the reflection ($R_s$) of the S-polarized component, and the Brewster's angle ($\theta_B$) are expressed as follows:

$$R_p = \tan(\theta_1 - \theta_2)/\tan(\theta_1 + \theta_2) \quad (1)$$

$$R_s = \sin(\theta_1 - \theta_2)/\sin(\theta_1 + \theta_2) \quad (2)$$

$$n_1 \sin\theta_1 = n_2 \sin\theta_2 \quad (3)$$

$$\theta_B = \tan^{-1}(n_2/n_1) \quad (4)$$

Moreover, the beam intensity for transmitting the luminous medium is determined by the relationship between the polarization direction of the incident light and the polarization direction of the luminous medium when the polarized beam is made incident onto the luminous medium having the polarizing characteristics. Accordingly, if the light medium is rotated around the incident optical axis as a rotation axis, the intensity of a transmitted light varies corresponding to the rotation angle. Specifically, the beam intensity for transmitting the luminous medium varies depending on the incident angle of the beam with respect to the luminous medium and the rotation of the luminous medium around the incident optical axis as a rotation axis.

Thus, as shown in FIG. 1, the optical substrate 10b having polarizing characteristics is rotated around the incident optical axis as a rotation axis as shown by an arrow while the optical substrate 10b is slanted at a predetermined angle with respect to the incident optical axis. Then, the beam intensity for transmitting the optical substrate 10b varies by the relationship between the polarization direction of the optical substrate 10b and the polarization direction of the incident light. Furthermore, when a slope angle of the optical substrate 10b is set in a manner that the incident angle of the beam is set at a Brewster's angle, the reflectance of the P-polarized component becomes 0, as shown in FIG. 2, thereby the intensity of the transmitted beam can be adjusted in a state where the reflection is little. Accordingly, the beam intensity can be corrected easily and smoothly by providing the optical substrate 10b operated as described above in each of the optical paths.

When this method of correcting laser beam intensity is compared with a conventional method of correcting laser beam intensity by detaching the filters 17, the beam intensity is digitally adjusted only at certain intervals in detaching the filters 17. However, the beam intensity can be adjusted analogically and smoothly in the method of this embodiment. The laser beam intensity can be corrected enough in the multi-branched laser oscillation system requiring an accurate power control of the laser beam.

Moreover, in a conventional method, since the filters 17 need be detached whenever the correction is performed, the workability is significantly low. In the method of this embodiment, correction is enabled only by rotating the optical substrate 10b without changing the parts, thereby the workability can be significantly improved.

Figure 5:
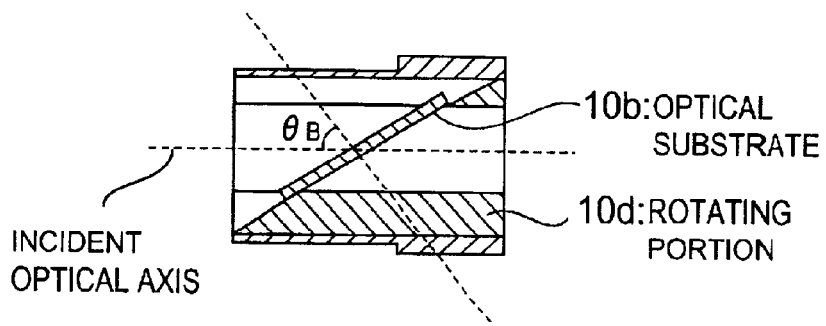
FIG. 5 is a cross-sectional view showing the constitution of the laser beam intensity correction mechanism of the present invention.
Figure 6:
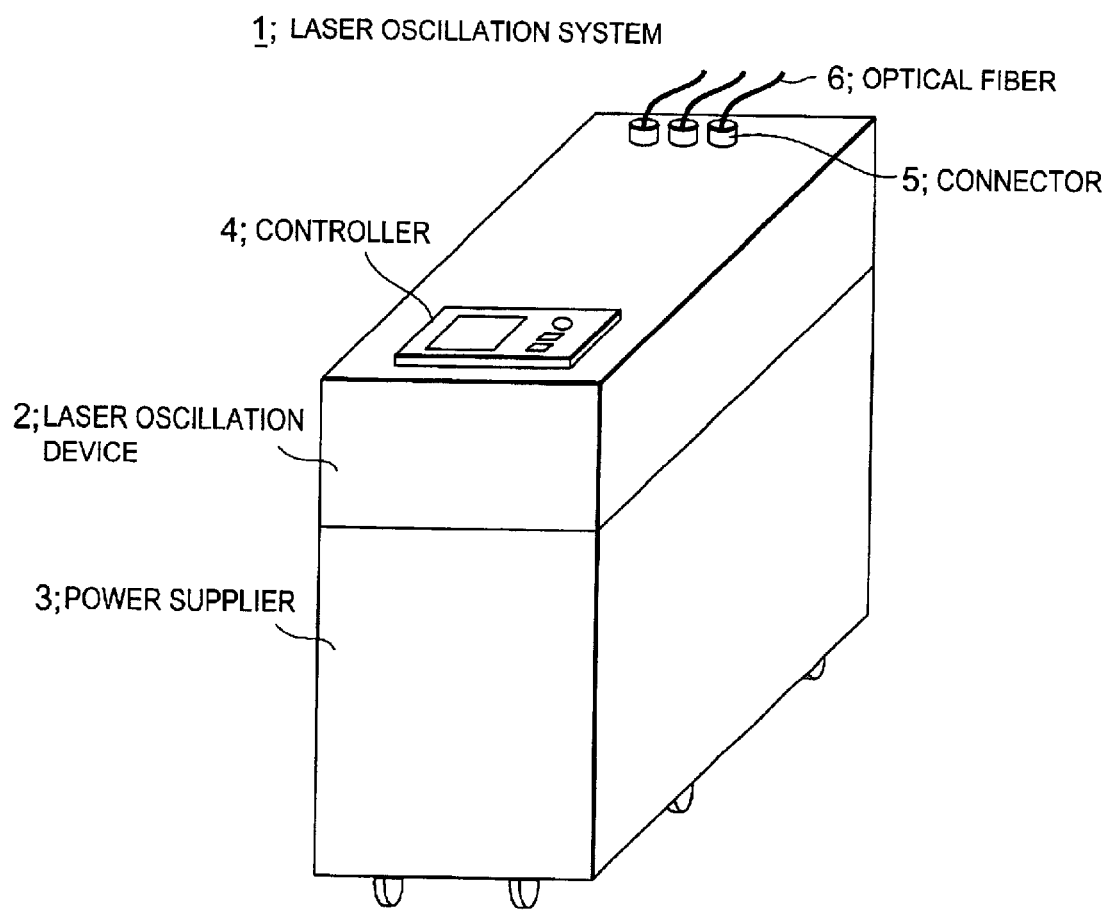
FIG. 6 is a perspective view schematically illustrating the laser oscillation system according to the embodiment of the present invention.
Figure 7:
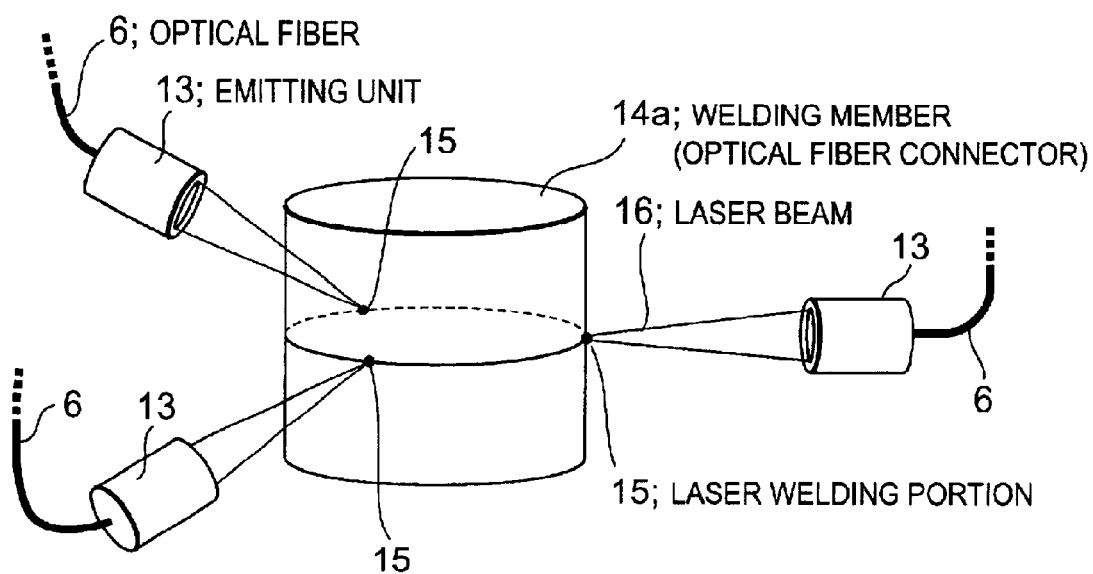
FIG. 7 is a perspective view illustrating the way in which optical fiber connectors are welded by using the laser oscillation system according to the embodiment of the present invention.
Figure 8:
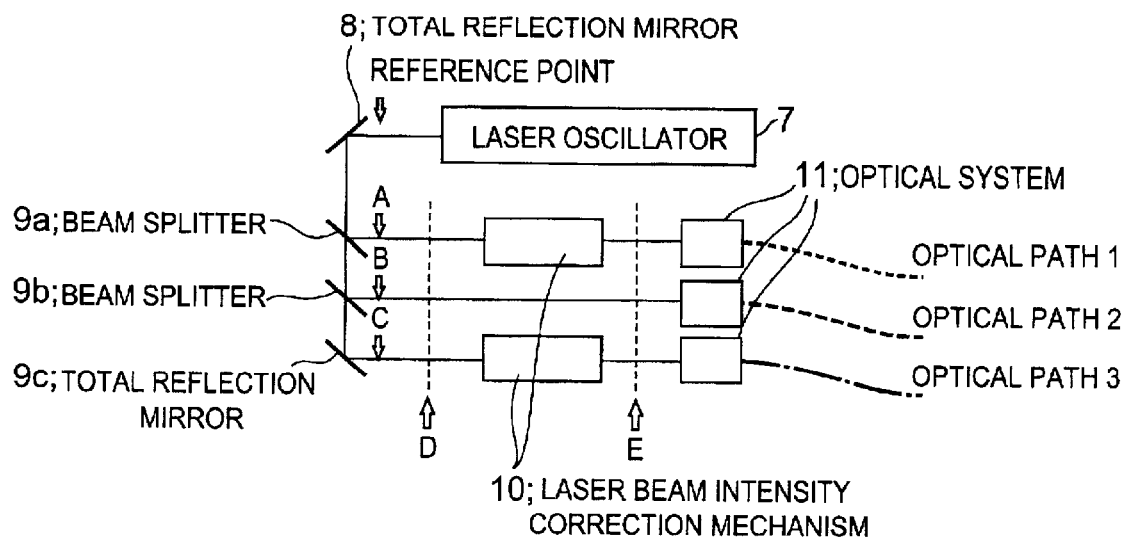
FIGS. 8(a) and 8(b) are cross-sectional views illustrating a method of adjusting the laser beam according to the laser oscillation device of the present invention.
Figure 8:
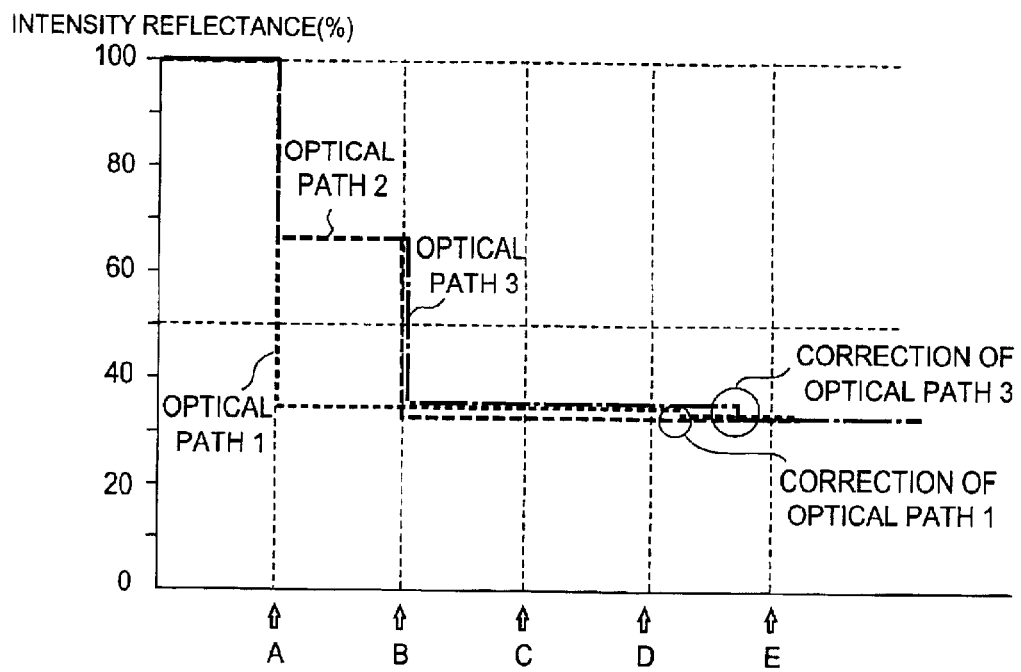
Figure 9:
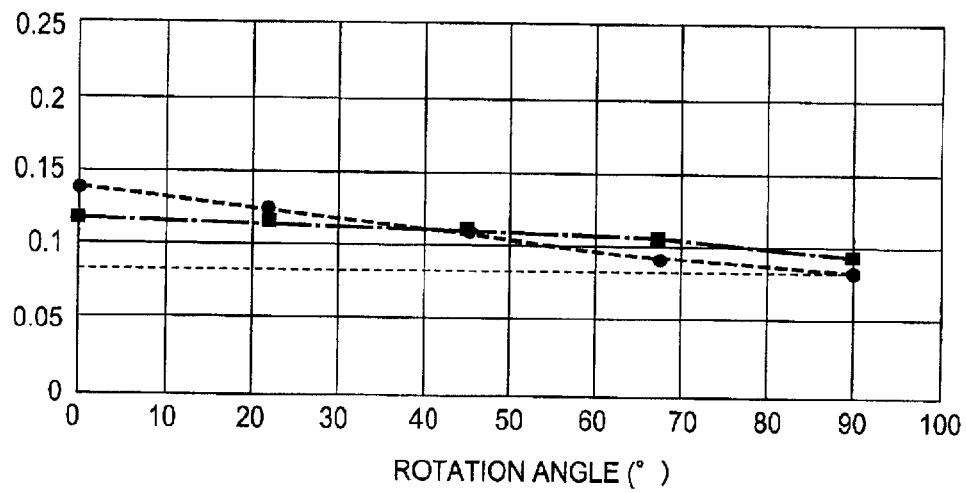
FIG. 9 is a view illustrating an effect of the laser beam correction mechanism and also showing a relationship between a rotation angle and the correction rate of an optical substrate.
Figure 10:
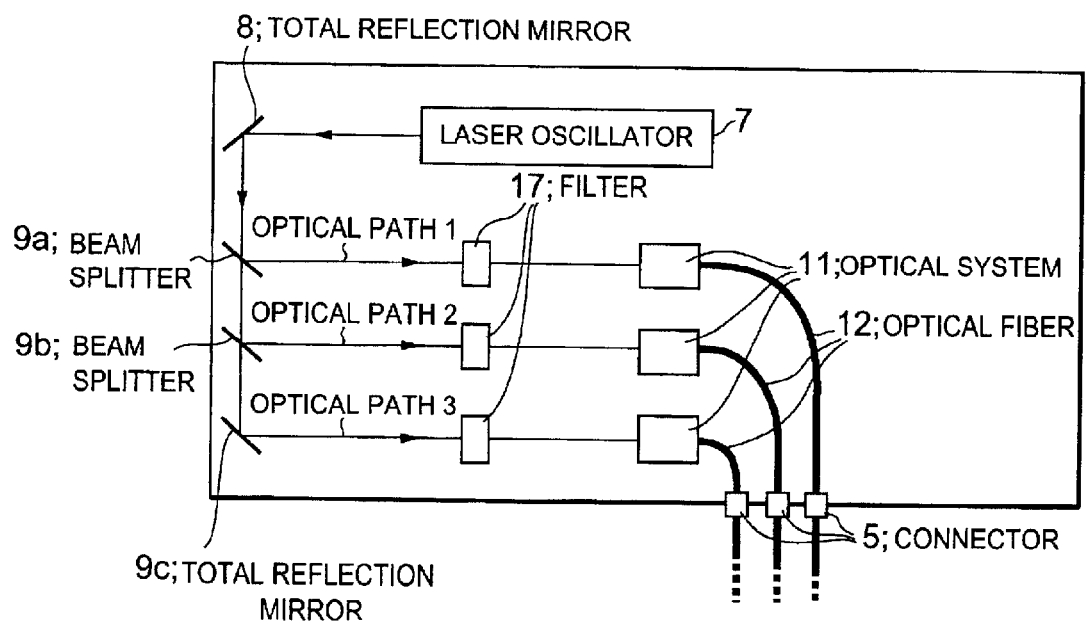
FIG. 10 is a plan view illustrating a constitution of a conventional laser oscillation device.
Figure 11:
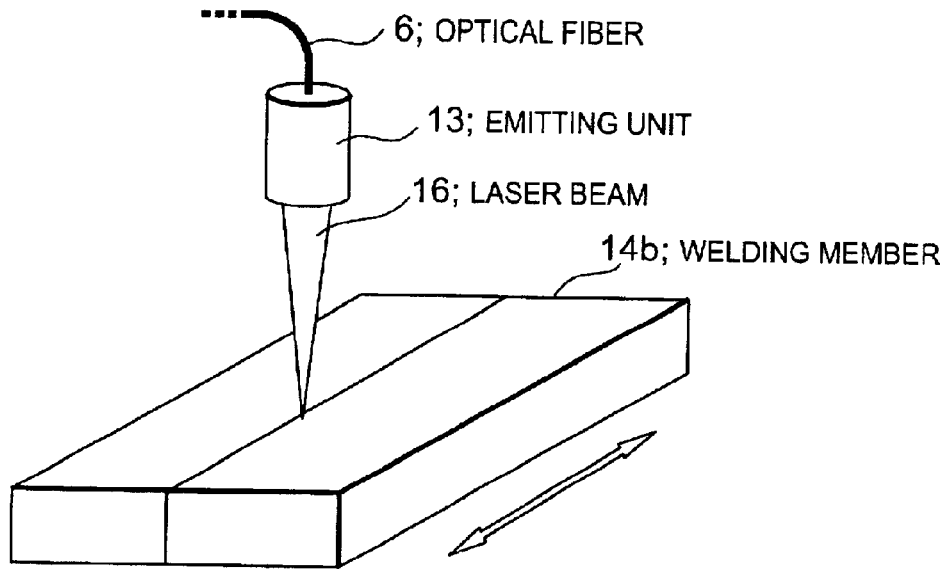
FIG. 11 is a perspective view showing welding by using a conventional laser oscillation system.
Figure 12:
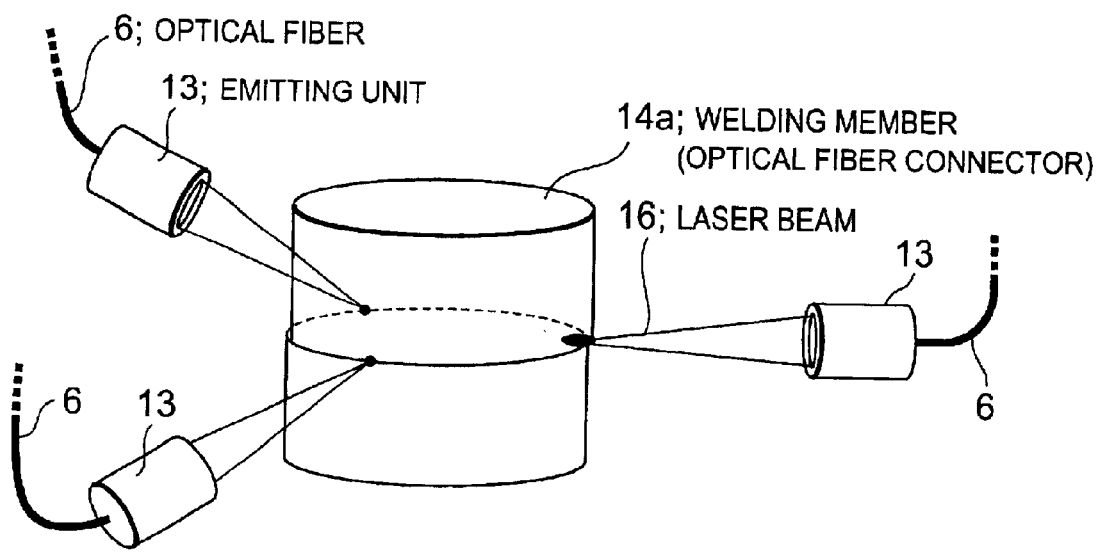
FIG. 12 is a perspective view illustrating the welding by using the conventional laser oscillation system.

Next, the method of correcting laser beam intensity, the laser beam intensity correction mechanism and the multi-branched laser beam oscillation device having the correction mechanism are explained with reference to FIGS. 3 to 9. FIG. 3 is the plan view schematically explaining the constitution of the laser oscillation device incorporating the laser beam intensity correction mechanisms of this embodiment. FIGS. 4(a) to 4(c) and FIG. 5 are views showing the constitution of the laser beam intensity correction mechanism which is a characteristic part of the present invention. FIG. 4(a) is a front view; FIG. 4(b) is a side view; and FIG. 4(c) is a top view. FIG. 5 is a cross-sectional view of the rotating portion. FIG. 6 is a perspective view showing the whole constitution of the laser oscillation system incorporating the laser oscillation device. FIG. 7 is a perspective view showing the laser welding of optical fiber connectors by using this system. FIGS. 8 and 9 are views showing the effect of the present invention.

The laser oscillation device of this embodiment is explained with reference to FIG. 3. The laser oscillation device 2 includes: a laser oscillation device 7 oscillating a laser beam such as YAG; a total reflection mirror 8 leading the laser beam to diverged paths; beam splitters 9a and 9b and a total reflection mirror 9c leading the laser beam to each optical path; a laser beam intensity correction mechanisms 10 correcting the laser beam intensity in each optical path which is a characteristic part of the present invention.

Then, in order to approximately equalize the intensity of the laser beam led to each optical path, the beam splitter 9a is set to reflect one-third of the laser beam and transmit other two-thirds thereof, while the beam splitter 9b is set to reflect one-second and transmit other one-second thereof; and the total reflection mirror 9c is set to reflect the laser beam totally. In this embodiment, each laser beam led to each of optical paths 1 to 3 is further corrected so that the laser beam intensity in each optical path is equally divided by each the laser beam intensity correction mechanism 10. Thereafter, this laser beam is irradiated outwards through each of the optical systems 11, each of the optical fibers 12 and each of the connectors 5.

The constitution of the laser beam intensity correction mechanism 10, which is a characteristic part of this embodiment is explained with reference to FIGS. 4(a), 4(b), 4(c) and 5. The laser beam intensity correction mechanism 10 comprises: a case 10a; a rotating portion 10d smoothly rotating by rotation lever 10c in the case; an optical substrate 10b fixed to the rotating portion 10d. The optical substrate 10b is fixed so that the normal line is slanted at the degree of a Brewster's angle with respect to the optical axis of the laser beam (namely, the incident angle is set at the Brewster's angle).

When the lever 10c is moved as shown in FIG. 4(a), the rotating portion 10d is rotated around the optical axis by 90°, thereby the optical substrate 10b fixed to the rotating portion 10d is rotated around the optical axis while maintaining the Brewster's angle with respect to the optical axis. As described in the above first embodiment, the transmittance of the laser beam can be varied corresponding to the rotation angle while the reflection of the P-polarized component is suppressed.

Note that, in this embodiment, a quartz plate is used as the optical substrate 10b, optical glass materials or optical crystals such as BK7, CaF$_2$, MgF$_2$, which have polarizing characteristics, can be used. In this case, the Brewster's angle is varied corresponding to a refractive index of the optical substrate 10b, thereby the slope angle of the optical substrate 10b needs to be varied suitably. In addition, the loss of the laser beam caused by reflection can be further decreased by providing an antireflection coating on both of the surfaces or one surface of optical substrate 10b.

Then, the method of correcting laser beam intensity using the laser beam oscillation device 2 having the above-described constitution is explained with reference to FIGS. 8 and 9.

FIG. 8(a) is a plan view showing the constitution of the laser oscillation device 2 and FIG. 8(b) is a view showing the laser beam intensity in each point of FIG. 8(a). In this embodiment, the laser beam intensity correction mechanisms 10 are provided in optical paths 2 and 3. However, the laser beam intensity correction mechanisms 10 may be provided in optical paths except a reference optical path (optical path 2 in FIG. 8), and maybe provided in all the optical paths.

First, the optical path 2 (rough broken line) used as a reference optical path is explained. The laser beam emitted from the laser oscillation device 7 is totally reflected by the total reflection mirror 8 and is made incident onto the beam splitter 9a. The beam splitter 9a is set to reflect only one-third of the quantity of light, thereby other two-thirds of the quantity of light of the laser beam is transmitted and is made incident onto the beam splitter 9b. Since the beam splitter is set to reflect one-second of the quantity of light, the laser beam having an amount of the light equal to $(2/3) \times (1/2) = 1/3$ of the reference optical light is made incident onto the respective optical system 11 (see FIG. 8(b)).

Second, the optical path 1 (fine broken line) is explained. The laser beam emitted from the laser oscillation device 7 is totally reflected by the total reflection mirror 8, and then, only one-third of the quantity of light is reflected by the beam splitter 9a, thereby one-third of the quantity of light of the reference laser beam can be obtained at a point A.

If the reflectance and transmittance of the beam splitters 9a and 9b are set accurately, the laser beam intensity in the optical paths 9a and 9b can be equal to each other. However, it is, in fact, difficult to fabricate the beam splitters 9a and 9b by accurately controlling the characteristics of the reflection and transmission. In addition, there arises angular dependence in the reflectance, and thus there arises a slight difference between the beam intensity in the optical path 1 and the optical path 2. Then, as shown in a circled part of FIG. 8(b), the laser beam intensity correction mechanism 10 finely adjusts the transmittance in optical path 1. Thereafter, the laser beam intensity in the optical path 1 is adjusted to be equal to that in the optical path 2, thereby the laser beam is led to the respective optical system 11.

Similarly, in the optical path 3, two-thirds of the quantity of light is transmitted by the beam splitter 9a, and other one-second of the quantity of light is further transmitted by the beam splitter 9b, and then, rest of the quantity of light is totally reflected by the total reflection mirror 9c, thereby the laser beam intensity at a point C becomes one-third of the quantity of light of the reference laser beam. However, in fact, there arises a slight difference of the intensity by the similar reason as described above. Thus, the transmittance in the optical path 3 is finely adjusted by the laser beam intensity correction mechanism 10 so as to be exactly equal to that in the optical path 1 and the optical path 2, and then, the beam is led to the respective optical system 11.

Thus, the laser beam intensity correction mechanism 10b is provided with the optical substrate 10b slanted so that the incident angle thereto is set at the Brewster's angle in each of the diverged optical paths except the reference optical path. The optical substrate 10b is rotated around the optical axis while maintaining the Brewster's angle, thereby the reflection of the P-polarized component is lost. Furthermore, the beam intensity for transmitting the optical substrate 10b can be adjusted easily and smoothly by the variance of the reflectance depending on the rotation angle of the optical substrate 10b.

The effect of adjusting the laser beam intensity correction mechanism 10 is explained with reference to FIG. 9. In the FIG. 9, the axis of abscissas denotes the rotation angle of the optical substrate 10b. The axis of the ordinates denotes the correction rate, that is, the quantity of the variance of the ratio of the difference between the two optical paths (the ratio of the difference to the reference) In this embodiment of the present invention in which the quartz is used as the optical substrate 10b, for example, in the optical path 2 (broken line), the correction rate is 0.14 in a state where the angle of the optical substrate is 0°. However, such correction rate decreases with the rotation of the optical substrate 10b and becomes 0.08 when the optical substrate 10b is rotated by 90°. In the optical path 3 (one-dotted line), the correction rate is 0.12 at the angle of 0° and is 0.09 at the angle of 90°. The correction rate decreases smoothly with the increase of the rotation angle in both optical paths. Accordingly, the beam intensity can be adjusted finely and smoothly using the constitution of the embodiment.

Moreover, since the adjustment of the laser beam intensity is conducted only by moving the lever 10c, troublesome work such as disassembling the laser oscillation device or detaching the filters in the collection can be saved. The workability of maintenance is highly improved, and handling is further improved. Further, operativity can also be improved when the lever 10c is moved by a motor.

Note that the range of the correction rate is different between the optical path 2 and the optical path 3 because the state of polarization of the laser beam is varied by the beam splitter or the reflection mirror, and the level of the interaction between such optical paths and the optical substrate 10b is varied. In order to determine the quantity of correction of the laser beam intensity within the desired range of values, the optical substrate having different polarizing characteristics may be used. For example, if an optical substrate having a high polarization is used, the adjustment range of the correction rate can be increased, and the optical substrate can suitably be selected by generally considering the constitution of the laser oscillation device or accuracy of the beam splitters.

FIG. 6 shows the constitution of the laser oscillation system 1 incorporating the laser oscillation device 2 of this embodiment. This laser oscillation system 1 includes: a laser oscillation device 2; a power supplier 3 supplying power to the laser oscillation device 2; a controller 4 controlling laser oscillation. The diverged laser beams are output to the outside by optical fibers 6 through connectors 5, respectively. As shown in FIG. 7, when parts for optical communication such as optical fiber connectors 14a are welded by using the laser beams of the optical paths 1, 2 and 3 in which the beam intensity are divided exactly and equally, each welding spot has an equal laser beam intensity, and thus, the level of fusion at the welding spot can equally be maintained. Accordingly, problems such as dislocation of connectors 14a caused by an influence from a portion having high output of the laser beam as in a conventional method can be avoided.

In the embodiment, explained is an example in which the laser beam is divided into three optical paths. The present invention is not limited to the above embodiments, and can be applied to any system which diverges the laser beam to a plurality of optical paths. In this case, the laser beam intensity correction mechanism 10 may be set in the optical path except the reference optical path. Moreover, in the above embodiments, the optical substrate 10b is slanted in a manner that the incident angle is set at the Brewster's angle. Setting the Brewster's angle thereto is to increase an extinction factor of the P-polarization and the S-polarization. It is possible to adjust the transmittance by rotating the substrate 10b at an angle except Brewster's angle. In this case, if a small angle is set, the adjustment range is narrowed and thus enabling the fine adjustment.

As described above, in the method of correcting laser beam intensity and the laser beam intensity correction mechanism of the present invention, the optical substrate slantly provided in a manner that the incident angle is set at the Brewster's angle with respect to the incident optical axis is rotated around the incident optical axis as a rotation axis while maintaining the Brewster's angle, thereby the reflection of P-polarized component is lost and the loss of the laser beam by reflection is suppressed. Furthermore, the intensity of the transmitted light can smoothly be adjusted corresponding to the angle of rotation of the optical substrate, and thus, the laser beam intensity diverged to a plurality of the optical paths can be corrected easily and exactly.

In the laser oscillation device provided with the laser beam correction function of the present invention, the intensity of the laser beam emitted from each optical path can be exactly divided when optical communication apparatus such as an optical fiber connector is laser-welded, thereby the level of fusion of a plurality of welding spots can equally be maintained and dislocation caused by the laser welding can also be prevented.

In addition, the laser beam intensity correction mechanism of these embodiments can adjust the laser beam intensity only by moving the lever, thereby the adjustment operation can effectively be conducted in comparison to a conventional method of correcting laser beam intensity which requires detaching the filters. Furthermore, the adjustment operation can automatically be conducted by the laser beam intensity correction mechanism having the constitution in which the lever is moved by a motor or the like, and thus, the workability is further improved.

What is claimed is:

1. A method of correcting laser beam intensity by using laser beam intensity correcting mechanism including a beam splitter for splitting an input laser beam into a plurality of optical paths, a rotation cylinder being rotated around an optical axis of the laser beam as a rotation axis arranged in at least one of the plurality of optical paths and an optical substrate fixed at a predetermined slope angle with respect to the optical axis provided in the rotation cylinder, comprising step of:

splitting the input laser beam into a plurality of optical paths to form a plurality of split laser beams, a state of polarization of the plurality of split laser beams being varied; and rotating the rotation cylinder to rotate the optical substrate around the optical axis as the rotation axis while maintaining the slope angle.

2. The method of correcting laser beam intensity according to claim 1, further comprising a step of:

adjusting the laser beam intensity in each optical path to be equal to others.

3. The method of claim 1, wherein the input laser beam is a random laser beam.

4. The method of claim 1, wherein the input laser beam is a non-polarized laser beam.

5. The method of claim 1, wherein the input laser beam is one of a random laser beam and a non-polarized laser beam and the formed plurality of split laser beams are partial polarized beams.

6. A laser generating device comprising laser beam source, a beam splitter for splitting the laser beam emitted from the laser beam source into a plurality of optical paths and correcting means for correcting laser beam intensity, the correcting means being provided in at least one of the optical paths, wherein a state of polarization of a split laser beam in at least one of the plurality of optical paths is varied and the correcting means includes a rotation cylinder being rotated around an optical axis of the split laser beam as a rotation axis the laser beam as a rotation axis in the case and an optical substrate slantly fixed such that the incident angle of the split laser beam is set at the Brewster's angle.

7. A laser generating device according to claim 6, wherein the correcting means is provided in an optical path except a reference optical path.

8. The laser generating device of claim 6, wherein the laser beam emitted from the laser beam source is a random laser beam.

9. The laser generating device of claim 6, wherein the laser beam emitted from the laser beam source is a non-polarized laser beam.

10. The laser generating device of claim 6, wherein the beam putter accepts a random or non-polarized laser beam and the split laser beam is a partial polarized beam.

11. A laser generating device comprising:

a laser beam source;

a first beam splitter for splitting a laser beam emitted from the laser beam source into first and second split laser beams;

a second beam splitter for splitting the second split laser beam into third and fourth split beams;

first correcting means for correcting intensity of the first split laser beam and second correcting means for correcting intensity of the first split laser beams, wherein, a state of polarization of the first split laser beam and the fourth split laser beam are varied and the first and second correcting means includes a rotation cylinder being rotated around an optical axis of the first and fourth split laser beams as a rotation axis and an optical substrate slantly fixed such that the incident angle of the first and fourth split laser beams is set at the Brewster's angle.

12. The laser generating device of claim 11, wherein the laser beam emitted from the laser beam source is a random laser beam.

13. The laser generating device of claim 11, wherein the laser beam emitted from the laser beam source is a non-polarized laser beam.

14. The laser generating device of claim 11, wherein the first beam splitter accepts a random or non-polarized laser beam and the first and second split laser beams are partial polarized beams.

* * * * *